Patented Jan. 7, 1936

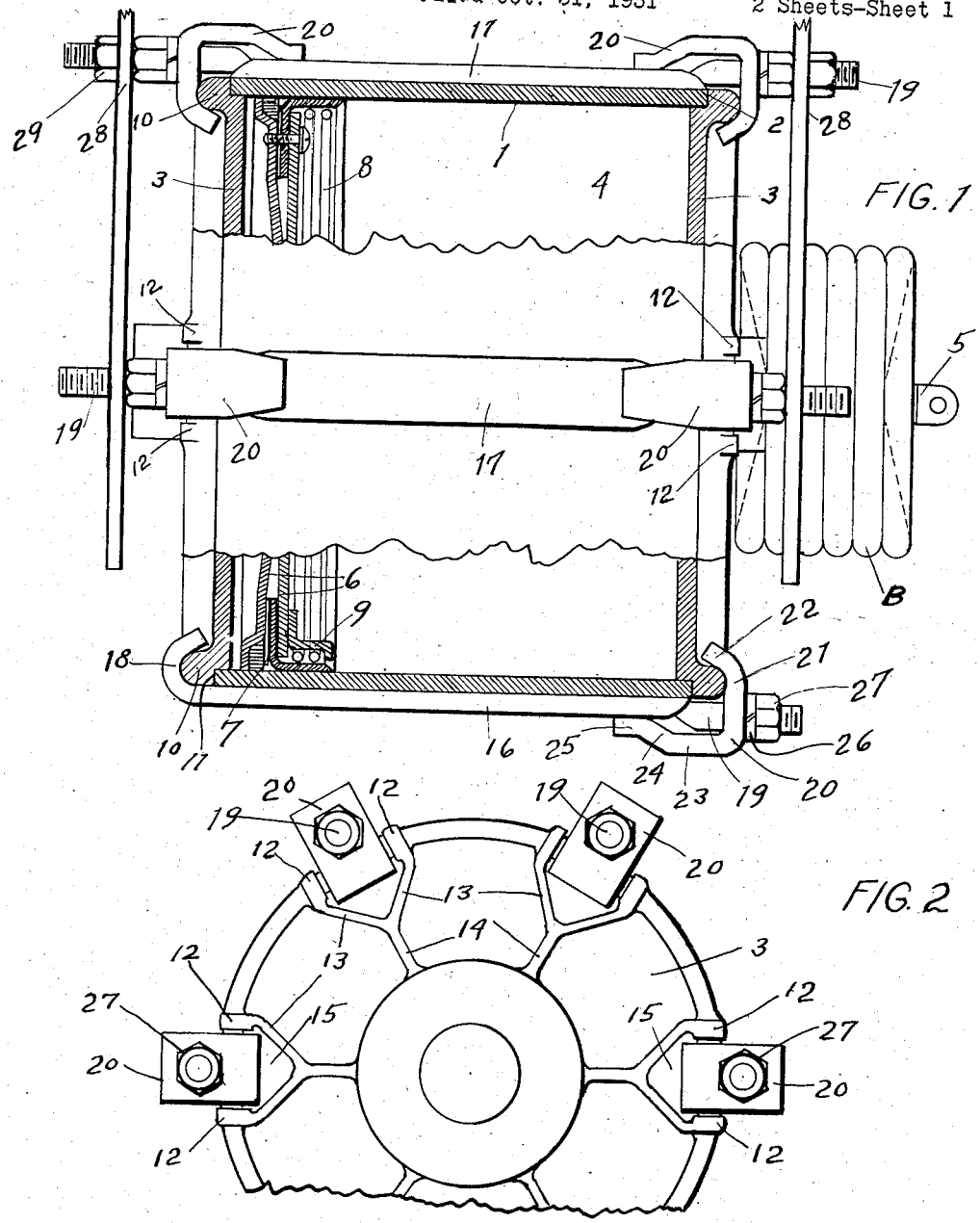

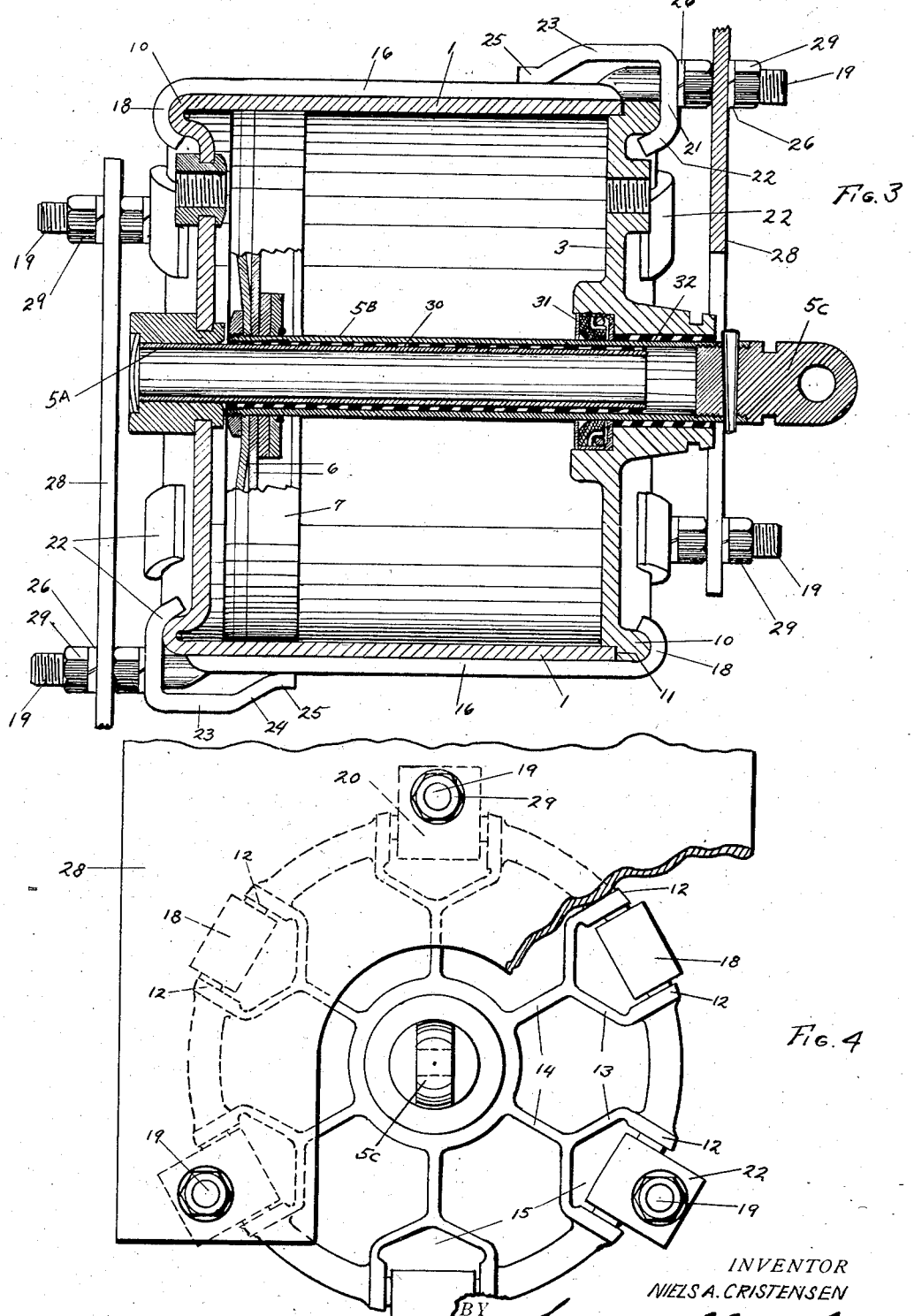

2,026,672

UNITED STATES PATENT OFFICE 2,026,672

POWER CYLINDER

Niels A. Christensen, South Euclid, Ohio

Application October 31, 1931, Serial No. 572,427

9 Claims. (Cl. 220—55)

This invention relates to new and useful improvements in power cylinders in which force is transmitted by means of a piston therein to apply the brakes of vehicles by power instead of manually.

An important object of the invention resides in the provision of means for securely fastening the closure plates to the end of the power cylinder, which fastening means will obviate the possibility of damage to the closure plates such as frequently occurs with closure plates having radial lugs when the bolts are tightened up against the lugs causing them to crack or break off.

Another important object of the invention resides in the provision of fastening straps to take the place of the usual round bolts for securing the closure plates to the ends of the power cylinder which straps closely hug the cylinder and are relatively wide to cover large parts of the circumference of the cylinder and thereby protect the same from damage caused by flying missiles under the vehicle.

Another object of the invention is to provide for certain of the fastening straps constituting means for securing the power cylinder to the automobile chassis.

Other objects and advantages of the invention will become apparent during the course of the following description.

In the accompanying drawings, forming a part of the descriptive matter and wherein like numerals are employed to designate like parts throughout the several views:

Fig. 1 is a side elevation of a power cylinder with the invention applied, certain portions of the cylinder being broken away to illustrate the two different manners in which the closure plates are firmly clamped to the ends of the cylinders, Fig. 2 is a fragmentary end elevation of the same, Fig. 3 is a longitudinal section through the cylinder and piston therein and, Fig. 4 is an end elevation of said cylinder showing a modified arrangement of fastening elements.

Referring now more particularly to the drawings in detail, the numeral 1 designates a power cylinder having one or both ends open and, if desired, machined to form true seats 2, for the one or two end closure plates 3, thereby constituting an air tight chamber 4, capable of maintaining pressure or vacuum. While a separate closure plate for each end of the cylinder has been illustrated, it will be apparent that one end of the cylinder can be formed integral with the end with an annular bead or flange and only one closure plate employed for the single open end of the cylinder. Reciprocably mounted in the cylinder, is a piston having a piston rod extending rearwardly of the cylinder to be suitably connected to the brake rigging not shown. The piston is composed of a pair of discs 6, having clamped between their margins, a flexible piston cup 7, having its angularly disposed circumferential margin pressed into snug engagement with the interior cylindrical walls of cylinder 1 by means of an expansible coil spring 8. This spring is prevented from displacement by means of a plurality of clips 9, secured to one end of the piston disc 6 and bent over the spring as clearly shown in Fig. 1.

Each end closure plate 3 is preferably cast with a circumferentially extending flange 10, forming an annular seat 11, for the reception of an end of the cylinder. This seat may be machined to make a snug fit with the machined end of the cylinder and if desired, a gasket may be positioned upon this seat to assure the desired seal. The flange 10 is enlarged axially into a rounded bead as shown, to provide substantial surfaces for the fastening means to be presently described. At suitably spaced intervals circumferentially of this flange are disposed complementary pairs of spaced shoulders 12, extending beyond the beaded surfaces of the flange to prevent accidental lateral shifting movement of the means for attaching the closure plates to the ends of the cylinder. In order to suitably strengthen each closure plate 3, reinforcing ribs 13 are cast on the exterior surface of the plate and converge from each pair of shoulders 12 to meet a radially extending reinforcing rib 14. In this manner the converging reinforcing ribs provide depressions 15 in the outer surface of the closure plate 3 at spaced intervals circumferentially thereof; such depressions being disposed between and inwardly of the pairs of shoulders 12.

Each end plate is provided with an integral elongated bearing for a telescopic piston rod, one section 5a of which is fixed in the bearing on the left-hand end plate 3, while the other section 5b telescopes over this sleeve with an elongated graphite composition sleeve 30 disposed therebetween and extending substantially the full length of the first section. The outer telescopic section slides through an air tight bearing 31 in the opposite end plate and a second graphite composition sleeve 32 exteriorly of which it is coupled with the coupling 5c. After the piston assembly is inserted into the cylinder, the two end plates 3 are seated on the ends of the cylinder as illustrated with the pairs of shoulders 12 on the two end plates arranged in alignment and in complementary pairs as illustrated in Fig. 1.

A plurality of fastening elements in the form of metallic straps 16 and 17, are provided for securely attaching both end plates to the cylinder in tight relationship. These straps extend longitudinally of the cylinder 1 and are so arranged at spaced intervals circumferentially thereof to be disposed between the complementary pairs of shoulders or lugs 12, on both end plates or upon one end plate and one end of the cylinder. These straps 16 and 17 are arcuate in transverse section to closely hug and cover a large area of the exterior surface of the cylinder. The straps 16 at the lower end of the cylinder, each have one end thereof angularly disposed and arcuated to provide a hook 18 adapted to engage the circumferential flange 10 of one of the closure plates or an integral end of the cylinder, while the opposite end of the strap is formed into a threaded stud 19, projecting between a pair of the shoulders 12 and a slight distance beyond the closure plate at the opposite end of the cylinder. A detachable metallic clip 20 having a degree of resilience and of substantially V-shape, has one arm 21, thereof perforated to be received upon the stud 19 and the free end of this arm is arcuated as at 22 to engage around the circumferential flange 10 of the closure plate as illustrated. The other arm 23 of this clip, when properly associated with the stud 19 extends generally in a direction longitudinally of the strap and is provided with an offset portion 24 causing its free end 25 to engage the strap 16 between its ends. A lock washer 26 and a nut 27 are positioned upon the stud 19 and the latter is driven home to force the hooked portion 22 of the clip into binding engagement with the flange of the closure plate and upon further inward movement of the nut and clip, the free end 25 of the arm 23 of the clip is forced or sprung down into firm engagement with the body of the strap. This action simultaneously draws the hook 18 into firm engagement with the closure plate at the opposite end of the cylinder and moves the latter firmly down upon the seat at the end of the cylinder. In this manner, both closure plates are firmly clamped upon opposite ends of the cylinder to form an air tight seal.

As shown in Figs. 3 and 4, all of the straps 16, employed for clamping a closure plate upon the end of the cylinder, are duplicates and are arranged to extend in opposite directions, so that some of the studs 19 of the straps are located adjacent one end of the cylinder, while the studs of the other straps are arranged adjacent the opposite end of the cylinder. For instance, if six straps are employed, the studs of three of them may be arranged at one end of the cylinder and the studs of the remaining three positioned adjacent the opposite end of the cylinder. In such relationship, the straps have their studs 19 and clips 20 arranged in alternating relationship circumferentially around the ends of the cylinder so that two or more of the studs at each end of the cylinder are arranged in comparatively close relationship for extension through apertures in the chassis or supporting brackets 28. It will be seen in the present illustration that three of the studs 19 at opposite ends of the cylinder are extended through the supporting brackets 28 and that the latter are suitably shaped or apertured to avoid interference with the flexible boot "B" and other parts extending from the ends of the cylinder.

As an alternative arrangement of straps, ones having duplicate ends may be employed in which event the straps 17, associated with the upper portion of the cylinder are identically the same construction as the straps 16 with the exception that both ends thereof are reduced to form studs 19, corresponding to that formed on one end of each strap 16. This arrangement provides both ends of each strap 17 with elongated threaded studs 19, adapted to receive clips 20 at both ends thereof which engage the straps and the two closure plates in the same manner as described for the clip associated with the strap 16. The extended studs 19 of straps 17, extend through the brackets 28, for securely supporting the power cylinder at both ends. Lock nuts 29 are threaded upon the extended studs to clamp the mounting brackets 28 firmly against nuts 27 abutting the clips 20. Due to the lugs or abutments 12, it will be obvious that the straps cannot shift circumferentially around the cylinder.

As indicated previously, the cylinder 1 may be formed with one end integral therewith as shown in Fig. 4, so as to dispense with the necessity of employing two closure plates 3. In such a modification, the closed end of the cylinder is provided with an axially extending bead or annular flange 10, corresponding to the flange formed on the closure plate for the purpose of providing a secure footing for the hooks 18 and clips 20 of the straps.

As indicated in the objects of the invention, the closure plates of cylinders of this character heretofore used, have been formed with integral radially projecting apertured lugs for the reception of the ends of the bolts which extend longitudinally of the cylinder, but with such construction the lugs are very apt to become cracked or broken off when the nuts on the ends of the bolts are tightened severely. The present construction obviates this disadvantage, and also affords considerable protection to the cylinder against flying missiles, since the straps 16 and 17 are comparatively wide and closely hug the exterior of the cylinder to cover a considerable area thereof.

It will be understood that various changes in the size, shape and arrangement of the parts may be resorted to without departing from the spirit of the invention or the scope of the appended claims.

I claim:

1. The combination with a cylinder and closure plate therefor; of relatively wide transversely arcuated straps extending longitudinally of the cylinder conforming to the curvature thereof and closely engaging the same and having fastening means at opposite ends engaging the closure plate and end of the cylinder for clamping the closure plate on the cylinder and for protecting the cylinder from damage.

2. The combination of a cylinder having an open end, a closure plate having a flange resting upon the end of said cylinder, a relatively wide transversely curved fastening strap extending the full length of the cylinder and lying flat against the side thereof and having means at one end engaging an end of said cylinder, and means adjustable upon the element and engaging the flange of the closure plate to detachably mount the closure plate upon the cylinder.

3. The combination of a cylinder having an open end, a closure plate therefor, a fastening element extending longitudinally along the side of the cylinder and having a hook at one end engaging one end of said cylinder, and a resilient clip adjustably mounted upon said element and having a portion engaging the closure plate and another portion engaging the element between its ends for detachably mounting the closure plate upon the cylinder.

4. The combination of a cylinder having an open end, a closure plate having a flange resting upon the end of said cylinder, a fastening element extending longitudinally along the side of the cylinder and having a hook at one end engaging one end of said cylinder, and a substantially V-shaped clip detachably mounted upon the other end of said element and having one arm provided with an arcuate end embracing the flange of the closure plate and its other arm engaging said element between its ends.

5. The combination of a cylinder having an open end, a closure plate therefor, a fastening element extending longitudinally of the cylinder and engaging one end of the cylinder, a clip adjustably mounted upon said element, and means for causing the clip to exert forces acting substantially at right angles, one acting upon the closure plate and the other force acting upon the body of the element.

6. The combination of a cylinder having open ends, closure plates having flanges resting upon the ends of the cylinder, a strap extending longitudinally of the cylinder and having one end provided with a hook adapted to embrace the flange of one closure plate, the other end of the strap terminating in a threaded shank, a substantially V-shaped clip having one arm provided with an aperture for reception upon said shank and terminating in a hook to engage over the flange of the other closure plate, the other arm of said clip engaging the strap between its ends, and a nut threaded upon said shank and engaging said clip to spring the same into binding engagement with the flange and strap.

7. The combination of a cylinder having an open end, a closure plate therefor, and a plurality of flat straps extending longitudinally for the full length of the cylinder for securing the closure plate thereto and lying flat against the sides of the cylinder to protect the same against damage, each strap terminating at one end in an integral hook engaging one end of the cylinder, the other end of each strap terminating in an integral threaded shank, an anchor element through which said shank extends, and a nut on said shank for forcing the anchor element against the other end of the cylinder.

8. The combination of a cylinder having an open end, a closure plate therefor, resilient means engaging an end of the cylinder, fastening elements extending the full length of the cylinder for fastening the closure thereon, each fastening element having an integral hook at one end engaging the closure plate, the other end of each element terminating in an integral threaded shank extending through said resilient means, and nuts threaded on said shanks for forcing the resilient means against said cylinder.

9. A fastening element comprising an elongated flat strap having a hook formed at one end, the other end of said strap formed into a threaded shank, a substantially V-shaped clip having an opening in one arm through which the shank extends, the other arm of the clip extending at substantially right angles and having a deflected end adapted to engage a flat part of the strap, and a nut threaded on said shank to bear against said clip.

NIELS A. CHRISTENSEN.